United States Patent
Yugou

(10) Patent No.: US 6,683,778 B2
(45) Date of Patent: Jan. 27, 2004

(54) DEVICE FOR USE IN ELECTRIC VEHICLES FOR DETECTING ADHESION IN RELAY DUE TO MELTING

(75) Inventor: Masaki Yugou, Kadoma (JP)

(73) Assignee: Sanyo Electric Co., Ltd., Osaka (JP)

( * ) Notice: Subject to any disclaimer, the term of this patent is extended or adjusted under 35 U.S.C. 154(b) by 125 days.

(21) Appl. No.: 09/926,101

(22) PCT Filed: Feb. 19, 2001

(86) PCT No.: PCT/JP01/01185

§ 371 (c)(1),
(2), (4) Date: Aug. 31, 2001

(87) PCT Pub. No.: WO01/60652

PCT Pub. Date: Aug. 23, 2001

(65) Prior Publication Data

US 2003/0007305 A1 Jan. 9, 2003

(30) Foreign Application Priority Data

Feb. 18, 2001 (JP) .......................................... 2000-041554

(51) Int. Cl.⁷ .............................................. H01H 47/12
(52) U.S. Cl. ....................................... 361/179; 361/93.1
(58) Field of Search .............................. 361/79, 78, 87, 361/88, 93.1, 93.2, 23, 20, 18, 179

(56) References Cited

U.S. PATENT DOCUMENTS 6,330,140 B1 * 12/2001 Wilson-Jones et al. ........ 361/87
6,381,503 B1 * 4/2002 Dollhopf et al. ............... 700/22

FOREIGN PATENT DOCUMENTS

DE 197 53 852 A1 * 6/1999

* cited by examiner

*Primary Examiner*—Anthony Dinkins
(74) *Attorney, Agent, or Firm*—Rader, Fishman & Grauer PLLC

(57) ABSTRACT

A relay adhesion detecting device (10) of the invention is installed in an electric motor vehicle wherein a relay (14) is provided between a power source unit (12) comprising a plurality of secondary batteries and a load circuit including an electric motor for effecting or interrupting the supply of current from the power supply unit (12) to the load circuit. The device (10) comprises one secondary battery (12a) included among the batteries of the power source unit (12), the relay (14), an adhesion detecting circuit (16) and a CPU (31). The CPU (31) detects adhesion in the relay (14) due to melting by detecting the presence or absence of current flowing through a closed loop circuit comprising the secondary battery (12a), the relay (14) and the adhesion detecting circuit (16).

6 Claims, 3 Drawing Sheets

DEVICE FOR USE IN ELECTRIC VEHICLES FOR DETECTING ADHESION IN RELAY DUE TO MELTING

TECHNICAL FIELD

The present invention relates to a device for detecting adhesion in relays due to melting for use in electrically driven vehicles, such as electric motor vehicles, wherein the relay is interposed between a load circuit including an electric motor and a plurality of batteries for effecting or interrupting the supply of current from the batteries to the load circuit.

BACKGROUND ART

Electric motor vehicles are provided with a power source unit having a high voltage and a great capacity and comprising a plurality of secondary batteries, such as lead batteries or nickel hydrogen batteries, which are connected in series. Electric power is supplied from the power source unit to a load circuit including an electric motor.

Provided between the power source unit and the load circuit is a main relay, which is energized or deenergized by an on/off manipulation of a key switch (ignition switch) of the electric motor vehicle.

When the key switch is turned off by the user, the main relay is deenergized to electrically separate the load circuit from the power source unit, thereby preventing useless consumption of power and ensuring safety of maintenance.

The current flowing through the main relay and the load circuit is as great as up to 400 A if maximum, whereas the main relay capable of blocking the passage of such a great current is large-sized and expensive, so that main relays in used are smaller than 400 A in the value of the current that can be blocked.

When the main relay is erroneously deenergized in a state wherein the electric motor vehicle is accelerated, for example, for starting, with a great current flowing through the main relay, it is likely that the main relay fails to completely block the passage of current instantaneously, permitting occurrence of an arc across the contacts of the relay and adhesion of the contacts by melting.

Further when the electric motor vehicle is rapidly accelerated or decelerated during driving, a great charge or discharge current will flow through the main relay, consequently causing adhesion of the main relay contacts on melting.

If the main relay contacts become thermally adhered as described above, an abnormal current flows through the load circuit to cause damage to the electric motor or like load. The main relay is then unable to reliably prevent the power source unit from wasting electric power and to ensure the safety of maintenance.

Accordingly, a device has been proposed for detecting adhesion in main relays of electric motor vehicles due to melting by checking the presence or absence of current through a closed loop circuit which includes the main relay and a plurality of secondary batteries for providing a power source for the electric motor, etc. (JP-A No. 2000-173428)

However, the secondary batteries provided on the electric motor vehicle as the power source for the motor, etc. are all used as the power source for the main relay adhesion detecting device for the vehicle, so that a high voltage is applied to the main body of the device. This entails a need to use elements of great voltage resistance in constructing the circuit, further giving rise to the problem of making the device body greater in size and also the problem of low safety.

An object of the present invention is to provide a device having a compact main body and ensuring high safety for detecting adhesion in relays due to melting.

DISCLOSURE OF THE INVENTION

In an electrically driven vehicle wherein a relay is provided between a load circuit including an electric motor and a plurality of batteries for effecting or interrupting the supply of current from the batteries to the load circuit, the present invention provides a relay adhesion detecting device for detecting occurrence or absence of adhesion in the relay due to melting by detecting presence or absence of current flowing through the relay when the relay is unenergized using one or more of the batteries as a power source.

When the contact of the relay is not adhered by melting with the relay unenergized, no current flows through the relay and current flowing through the relay is not produced, but if the relay contact is adhered by melting, the current from one or more of the plurality of batteries flows through the relay to pass through the relay.

With the relay adhesion detecting device of the invention, accordingly, the relay is checked for the adhesion of its contact due to melting by detecting the presence or absence of current flowing through the relay.

The relay adhesion detecting device embodying the invention utilizes as its power source one or more of the plurality of batteries provided in the electrically driven vehicle and serving as a power source for the load circuit including the electric motor, so that the voltage to be applied to the device main body is lower than in the case of the conventional relay adhesion detecting device for which all the batteries installed in the vehicle serve as the power source. This makes it possible to use elements of small voltage resistance for the circuit, to compact the device main body and to achieve improved safety.

Stated more specifically, the device comprises:

a current passage line for passing current through the relay from one or more of the batteries serving as the power source, line switching means provided on the current passage line for opening or closing the current passage line, and adhesion detecting means provided on the current passage line for detecting occurrence or absence of adhesion in the relay due to melting by detecting presence or absence of current flowing through the current passage line.

When the relay contact is free of adhesion and opened with the line switching means closed in this specific construction, no current flows through the current passage line, whereas if the relay contact is adhered by melting, current flows through the line as closed.

With the specific construction, therefore, the relay can be checked for the adhesion of its contact due to melting by detecting the presence or absence of current flowing through the current passage line.

If the construction used has no line switching means and when the relay contact is adhered by melting, current would flow through the line over a long period of time to result in a waste of electric power.

With the specific construction described, on the other hand, the line switching means is closed only when the relay is checked for adhesion, obviating useless consumption of power.

Further stated specifically, the line switching means comprises:
  a photocoupler provided on the current passage line and operable by being supplied with current, and
  current supply means for supplying actuating drive current to the photocoupler.

When actuating drive current is supplied to the photocoupler from the current supply means in this construction, the photocoupler is actuated with the current to close the current passage line. If the supply of current to the photocoupler from the supply means is interrupted, on the other hand, the photocoupler is brought out of conduction upon detecting the interruption to open the current passage line. In this way, the line is closed or opened in accordance with the supply of current from the supply means to the photocoupler or interruption of the supply.

Further stated specifically, the adhesion detecting means comprises:
  a photocoupler provided on the current passage line and operable by being supplied with current, and
  means for checking the relay for adhesion due to melting based on the on/off state of the photocoupler.

When the relay is free of adhesion due to melting, no current flows through the current passage line in this specific construction as stated above, so that the photocoupler is then out of conduction. In the event of adhesion in the relay, current flows through the line to bring the photocoupler into conduction.

Accordingly, the relay is found free of adhesion when the photocoupler is off, whereas when in conduction, the photocoupler indicates adhesion occurring in the relay.

Further stated specifically, the current passage line is provided with a resistor for limiting the magnitude of current to be passed through the current passage line to not greater than a predetermined value.

In this specific construction, the magnitude of the current to be passed through the current passage line is limited to not greater than the predetermined value by the resistor. The above-mentioned one or more of the batteries can therefore be prevented from becoming thermally damaged owing to an excess current.

Stated further specifically, the device comprises means for informing the user of adhesion occurring in the relay due to melting when the adhesion is detected.

In the event of adhesion occurring in the relay due to melting in the specific construction, the user is informed of the occurrence of adhesion in the relay by a known method or information, for example, by actuating an alarm buzzer or turning on an alarm lamp. Accordingly, the person possessing or maintaining the vehicle can be readily informed of the thermal adhesion in the relay.

As described above, the relay adhesion detecting device embodying the invention for use in electrically driven vehicles can be compacted in the device main body and improved in safety.

BRIEF DESCRIPTION OF THE DRAWINGS

FIG. 3 is a flow chart showing the control procedure to be executed by the CPU when the key switch is turned on.

BEST MODE OF CARRYING OUT THE INVENTION

With reference to the drawings, a detailed description will be given of a device embodying the invention for use in electric motor vehicles for detecting adhesion in a relay due to melting.

Figure 1:
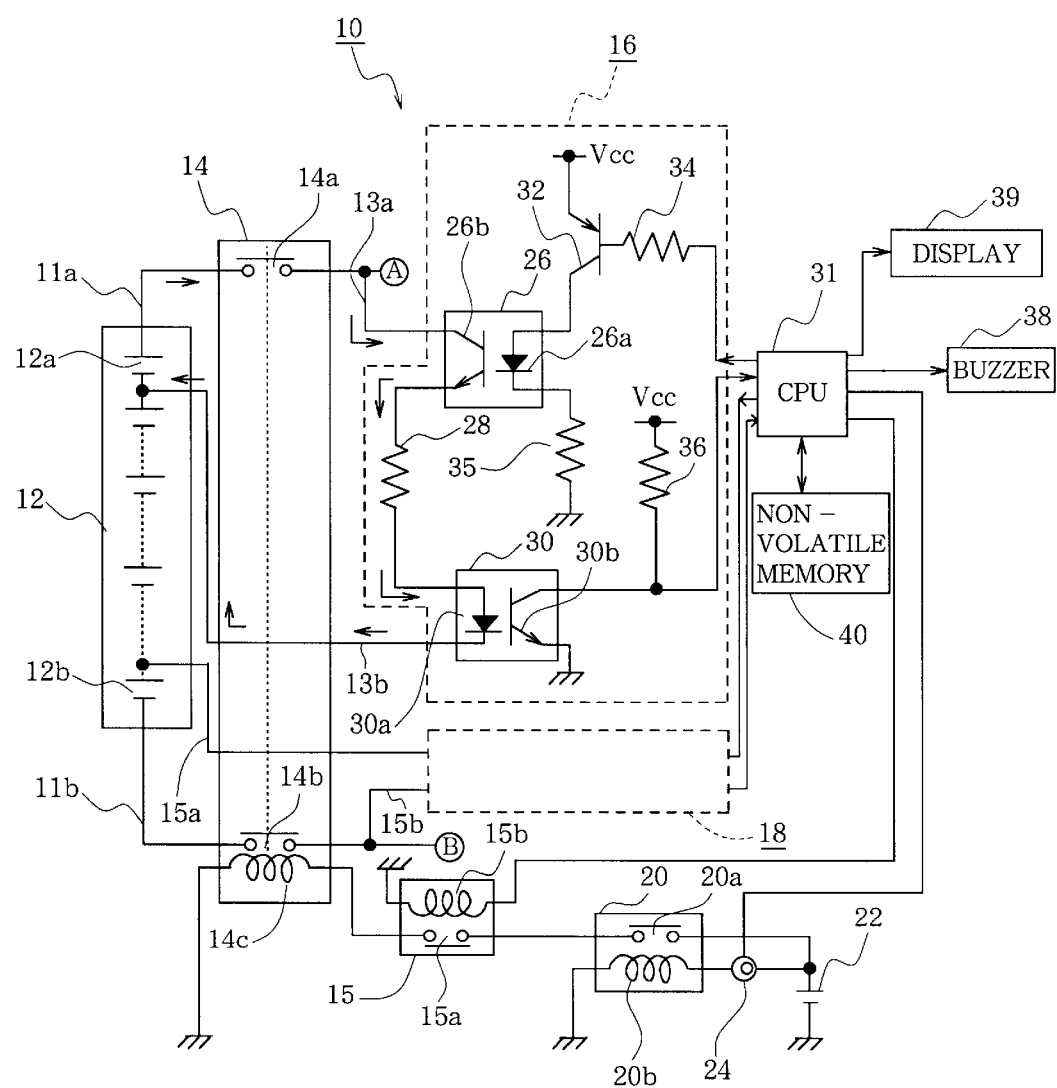
FIG. 1 is a diagram showing the circuit construction of power source assembly of an electric motor vehicle provided with a relay adhesion detecting device of the invention.

FIG. 1 shows the circuit construction of a power source unit of an electric motor vehicle provided with the device to the invention for detecting adhesion in the relay due to melting.

The electric motor vehicle shown in FIG. 1 is provided with a power source unit 12 of high voltage (e.g., of 200 to 300 V in overall voltage) comprising, for example, a plurality of secondary batteries 12a . . . 12b, such as nickel hydrogen batteries or lead batteries, which are connected in series.

Extending respectively from opposite ends of the power source unit 12 are a pair of main positive line 11a and main negative line 11b. Connected to a pair of output terminals A, B provided at the terminating ends of the pair of these lines 11a, 11b is a load circuit (not shown) including an electric motor and an inverter comprising a switching element such as an IGBT (Insulated Gate Bipolar Transistor).

Like conventional electric motor vehicles, the electric motor vehicle mentioned has a main relay 14 for effecting or interrupting the supply of electric current to the load circuit from the power source unit 12.

The main relay 14 has a first contact 14a and a second contact 14b which are provided on the respective main positive line 11a and main negative line 11b each at an intermediate portion of the line. The main relay 14 has a relay coil 14c for drivingly opening or closing the first contact 14a and the second contact 14b. A key switch 24 which can be turned on or off by the user is connected to the relay coil 14c by way of a delay relay 15 and an auxiliary relay 20. An auxiliary battery 22 is connected to the key switch 24.

The electric motor vehicle has a CPU 31. The delay relay 15 and the key switch 24 are connected to the CPU 31.

When the key switch 24 is turned on, current flows from the auxiliary battery 22 to the relay coil 20b of the auxiliary relay 20, whereby the relay contact 20a is closed to actuate the auxiliary relay 20. The closing of the key switch 24 is detected by the CPU 31, which supplies current to the relay coil 15b of the delay relay 15, whereby the relay contact 15a is closed to actuate the relay 15. When the auxiliary relay 20 and the delay relay 15 are actuated, current is supplied to the relay coil 14c of the main relay 14, whereby the first contact 14a and the second contact 14b of the main relay 14 are closed to actuate the main relay 14. In this way, the main relay 14 is actuated in response to an action of closing the key switch 24.

The electric motor vehicle is provided with the device 10 of the invention for detecting adhesion in the relay by melting.

The relay adhesion detecting device 10 has a first adhesion detecting positive line 13a branching off from the main positive line 11a between the first contact 14a of the main relay 14 and the output terminal A, and a first adhesion detecting negative line 13b extending from the negative electrode of the secondary battery 12a included among the secondary batteries 12a . . . 12b of the power source unit 12 and positioned at the positive-side end thereof. Connected to terminating ends of these lines 13a, 13b is a first adhesion detecting circuit 16 for detecting the adhesion, if any, of the first contact 14a of the main relay 14 due to melting as will be described below.

The relay adhesion detecting device 10 further has a second adhesion detecting positive line 15a extending from the positive electrode of the secondary battery 12b included among the secondary batteries 12a . . . 12b of the power source unit 12 and positioned at the negative-side end thereof, and a second adhesion detecting negative line 15b branching off from the main negative line 11b between the second contact 14b of the main relay 14 and the output terminal B. Connected to terminating ends of these lines 15a, 15b is a second adhesion detecting circuit 18 for detecting the adhesion, if any, of the second contact 14b of the main relay 14 by melting. Incidentally, the second adhesion detecting circuit 18 has the same construction as the first adhesion detecting circuit 16 and is therefore not shown.

The first and second adhesion detecting circuits 16, 18 are connected to the CPU 31. The CPU 31 has connected thereto a nonvolatile memory 40 for storing the result of detecting adhesion in the main relay 14 due to melting. Also connected to the CPU 31 are an alarm buzzer 38 and a display 39. In the case where the main relay 14 has its contact adhered by melting, the CPU 31 gives an actuation command to the alarm buzzer 38 and shows an error message on the display 39.

The first adhesion detecting circuit 16 comprises a first photocoupler 26 and a second photocoupler 30. The first photocoupler 26 and the second photocoupler 30 each comprise a light-emitting diode and a phototransistor.

The phototransistor 26b of the first photocoupler 26 has its collector connected to the first adhesion detecting positive line 13a and its emitter connected to the positive electrode of the light-emitting diode 30a of the second photocoupler 30 via a resistor 28. The first adhesion detecting negative line 13b is connected to the negative electrode of the diode 30a. The resistor 28 has the function of serving as a current limiting resistor for restricting the current to be supplied to the diode 30a of the second photocoupler 30 to not greater than a predetermined value, and also the function of a protective resistor for preventing the secondary battery 12a of the power source unit 12 from burning by an excess current. The magnitude of current to be admitted to the diode 30a of the second photocoupler 30 is limited usually to about 1 mA. For example when a 12-V secondary battery is used as the battery 12a, the resistor 28 is given a value of 12 kΩ.

In the case where the main relay 14 has its first contact 14a adhered by melting and when the phototransistor 26b of the first photocoupler 26 is in conduction, i.e., when the first photocoupler 26 is in a conducting state, a closed loop circuit is formed which extends from the positive electrode of the secondary battery 12a of the power source unit 12 to the negative electrode of the battery 12a by way of the first contact 14a of the main relay 14, the phototransistor 26b of the first photocoupler 26, the resistor 28 and the light-emitting diode 30a of the second photocoupler 30. Current then flows through the circuit as indicated by arrows in the drawing.

The light-emitting diode 26a of the first photocoupler 26 has its positive electrode connected to the CPU 31 via a transistor 32 connected to the power source and a resistor 34, and its negative electrode grounded via a resistor 35. The transistor 32 is on/off-controlled by the CPU 31. When the transistor 32 is brought into conduction, current flows through the light-emitting diode 26a of the first photocoupler 26, bringing the phototransistor 26b into conduction. Thus, the first photocoupler 26 is actuated.

The phototransistor 30b of the second photocoupler 30 has its collector connected to the CPU 31 and its emitter grounded. The line from the collector to the CPU 31 is connected to the power source by way of a resistor 36.

When the phototransistor 30b of the second photocoupler 30 is out of conduction, i.e., when the second photocoupler 30 is out of conduction, a high signal representing a high voltage value which is a value obtained by subtracting the value of a voltage drop by the resistor 36 from the power source voltage value Vcc is fed to the CPU 31.

On the other hand, when the phototransistor 30b of the second photocoupler 30 is conducting, i.e., when the second photocoupler 30 is in conduction, a low signal representing a low voltage value of zero is fed to the CPU 31.

When checking the first contact 14a of the main relay 14 for adhesion due to melting, the CPU 31 sets the first photocoupler 26 in conduction, with the first contact 14a opened.

In the event of the adhesion of the first contact 14a of the main relay 31, current flows through the above-mentioned closed loop circuit as indicated by arrows in the drawing, conducting the phototransistor 30b of the second photocoupler 30, i.e., conducting the second photocoupler 30. The low signal is therefore fed to the CPU 31.

On the other hand, if the first contact 14a of the main relay 14 is not adhered due to melting, the closed loop circuit is not formed, with no current flowing through the light-emitting diode 30b of the second photocoupler 30. The phototransistor 30b of the second photocoupler 30, i.e., the second photocouplter 30, is held out of conduction, and the high signal is fed to the CPU 31.

Accordingly, if the signal fed from the second photocoupler 30 to CPU 31 is the low signal, the signal indicates thermal adhesion of the first contact 14a of the main relay 14, while if the signal fed from the second photocoupler 30 is the high signal, this indicates that the first contact 14a of the main relay 14 is free of adhesion due to melting.

With the relay adhesion detecting device 10, one of the secondary batteries 12a . . . 12b constituting the power source unit 12 is utilized as the power source of each of the first and second adhesion detecting circuits 16, 18, so that the voltage to be applied to the device main body is as low as the voltage value of one secondary battery, e.g., about 12 V. Accordingly, the first and second adhesion detecting circuits 16, 18 comprise elements of low voltage resistance, rendering the device main body compact while ensuring high safety.

Figure 2:
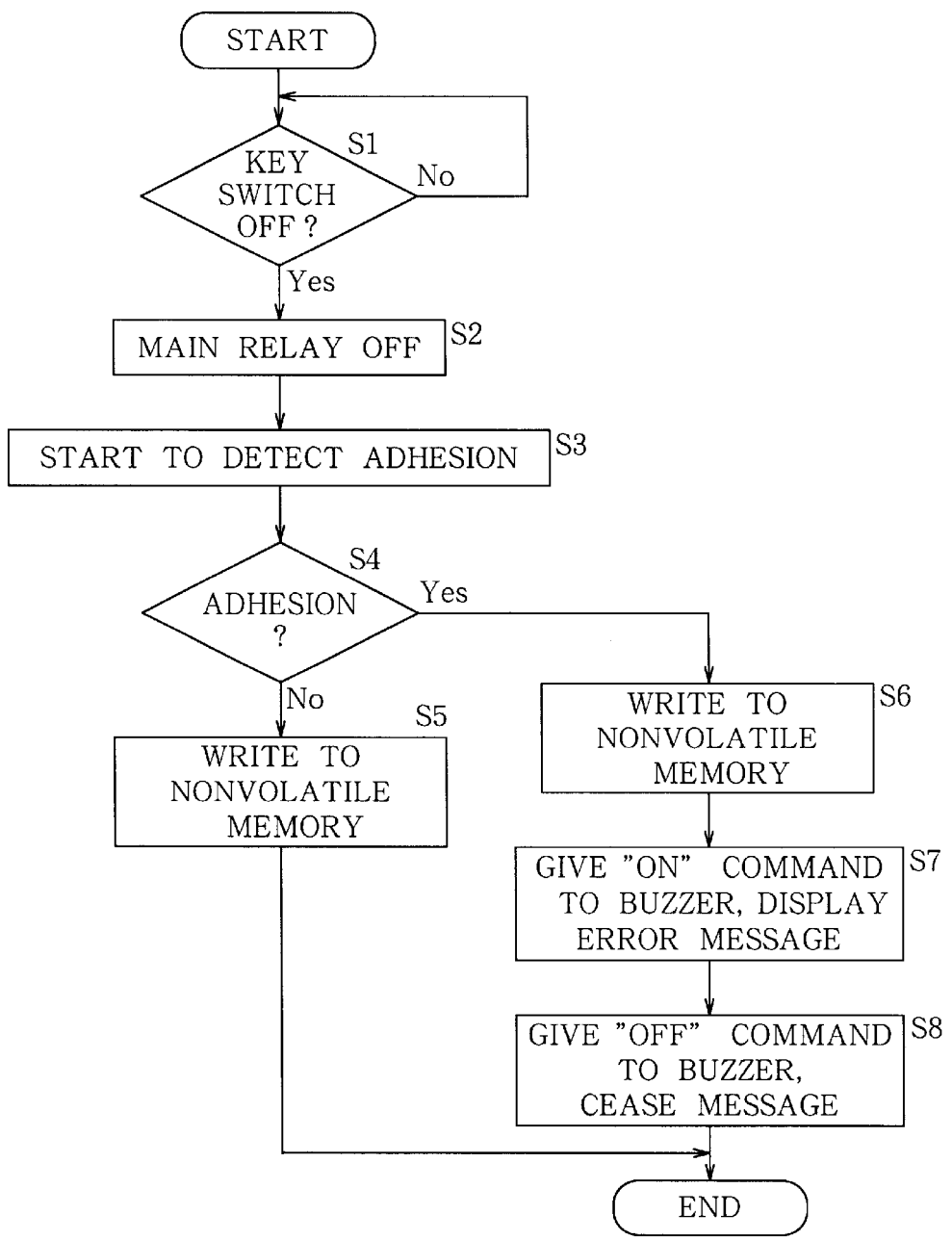
FIG. 2 is a flow chart showing the control procedure to be performed by a CPU when a key switch is turned off.

FIG. 2 shows the control procedure to be performed by the CPU 31 when the key switch 24 closed is turned off after driving. When the key switch 24 is turned off, the supply of power to the power source circuit (not shown) of the CPU 31 is discontinued, whereas power stored in a capacitor provided in the power source circuit is supplied to the CPU 31 to hold the CPU 31 energized only for about 2 seconds. The procedure to be described below is executed during this period of 2 seconds.

When the key switch 24 is turned off by the user, this change-over is detected in step S1, followed by step S2, in which the first contact 14a and the second contact 14b of the main relay 14 are opened to set the main relay 14 off.

Subsequently in step S3, the first photocoupler 26 of the first adhesion detecting circuit 16 is brought into conduction, and the first photocoupler (not shown) of the second adhesion detecting circuit 18 is brought into conduction, whereby the CPU starts to check the first contact 14a and the second contact 14b of the main relay 14 for adhesion by melting.

Inquiries are made in step S4 as to whether the first contact 14a of the main relay 14 is adhered with reference to the signal fed from the second photocoupler 30 of the first detecting circuit 16 and as to whether the second contact 14b of the main relay 14 is adhered with reference to the signal fed from the second photocoupler (not shown) of the second detecting circuit 18.

If the signal fed from the second photocoupler 30 of the first detecting circuit 16 and the signal fed from the second photocoupler of the second detecting circuit 18 are each the high signal, the inquiries are answered in the negative in step S4, followed by step S5 to write to the nonvolatile memory 40 information concerning the result of detecting adhesion and indicating whether the first and second contacts 14*a*, 14*b* of the relay 14 are adhered due to melting to terminate the procedure.

On the other hand, if one of the signal fed from the second photocoupler 30 of the first detecting circuit 16 and the signal fed from the second photocoupler of the second detecting circuit 18 is the low signal, or each of the signals is the low signal, the inquiries are answered in the affirmative in step S4, followed by step S6 to write to the nonvolatile memory 40 information concerning the result of detection of adhesion of the first and second contacts 14*a*, 14*b* of the relay 14. In step S7, an actuation command is thereafter given to the alarm buzzer 38, and an error message is presented on the display 39 to indicate adhesion in the main relay 14. Finally in step S8, a deenergization command is given to the alarm buzzer 38, and presentation of the error message is ceased to complete the procedure.

Upon turning off the key switch 24 closed, the first contact 14*a* and the second contact 14*b* of the main relay 14 are checked for adhesion due to melting by the above procedure, and when at least one of the contacts is found adhered, an alarm sound is produced from the buzzer 38 with an error message presented on the display 39 only for a short period of less than 2 seconds.

Figure 3:
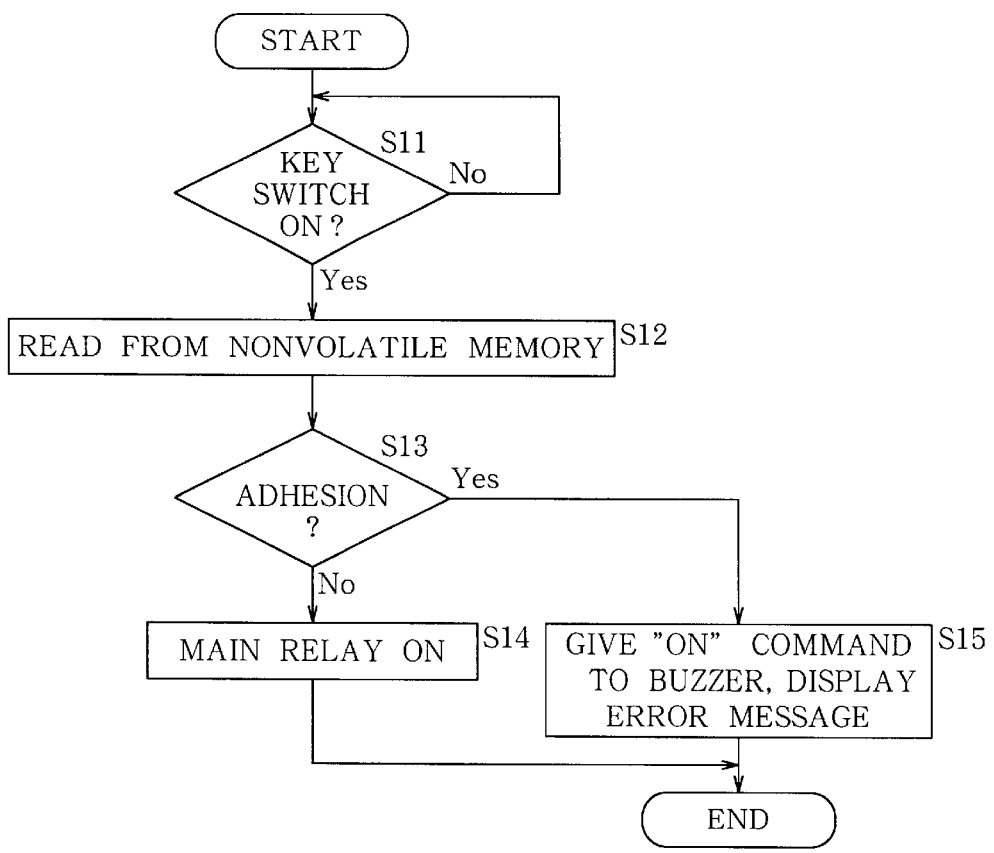

FIG. 3 snows the control procedure to be performed by the CPU 31 when the key switch 24 which is opened is turned on. Incidentally, the CPU 31 is actuated upon turning on the key switch 24 to execute the procedure to be described below.

When the key switch 24 is turned on by the user, this is detected in step S11, which is followed by step S12 to read from the nonvolatile memory 40 the information as to the result of detection of adhesion of the first and second contacts 14*a*, 14*b* of the main relay 14.

Subsequently in step S13, the first contact 14*a* and the second contact 14*b* of the main relay 14 are checked for adhesion with reference to the read information.

In the case where neither of the first and second contacts 14*a*, 14*b* of the relay 14 are found adhered, step S14 follows to close the first and second contacts 14*a*, 14*b* of the main relay 14 to actuate the relay 14 and complete the procedure.

On the other hand, if at least one of the first and second contacts 14*a*, 14*b* of the main relay 14 is found adhered by melting, the sequence proceeds to step S15 to give an actuation command to the alarm buzzer 38 and present on the display 39 an error message indicating adhesion in the relay 14, whereby the procedure is completed.

Upon turning on the key switch 24 as opened, the first contact 14*a* and the second contact 14*b* of the main relay 14 are checked for adhesion due to melting by the above procedure based on the result of detection of adhesion obtained previously upon turning off the closed key switch 24, and when at least one of the contacts is found adhered, an alarm sound is produced from the buzzer 38 with an error message presented on the display 39.

With the electric motor vehicle equipped with the relay adhesion detecting device 10 of the present embodiment, the alarm buzzer 38 produces an alarm sound with an error message presented on the display 39 when the key switch 24 as closed is turned off or when the key switch 24 as opened is turned on in the case where at least one of the first and second contacts 14*a*, 14*b* of the main relay 14 is adhered by melting. This readily indicates the adhesion in the main relay 14 to the person possessing or maintaining the vehicle. If the person thereafter repairs the main relay 14, it is unlikely that an abnormal current will flow through the load circuit to cause damage to the electric motor or the like although this will occur in the conventional electric motor vehicle not equipped with the relay adhesion detecting device. Furthermore, the device reliably precludes the power source unit 12 from consuming power uselessly, also ensuring safety of maintenance.

When the key switch 24 as opened is turned on, the main relay 14 is checked for adhesion by melting with reference to the result of detection of adhesion obtained when the key switch 24 is turned off previously. Adhesion is unlikely to occur in the main relay 14 with the key switch 24 in the off state, so that if the main relay 14 is free of thermal adhesion when the key switch 24 is turned off, the main relay 14 remains free of adhesion when the key switch 24 is subsequently turned on. Thus, the check result is highly reliable. Since the main relay 14 is checked for adhesion in this way upon turning on the key switch 24 based on the result of detection of adhesion obtained previously, the power consumption is smaller than when the operation to detect adhesion is performed also when the key switch 24 is turned on.

Further because the first photocoupler 26 of the first adhesion detecting circuit 16 and the first photocoupler of the second adhesion detecting circuit 18 are actuated only when the main relay 14 is to be checked for adhesion due to melting, it is unlikely that current will flow through the closed loop circuit over a long period of time as indicated by arrows in FIG. 1 even in the event of thermal adhesion occurring in the main relay 14. This obviates waste of electric power.

According to the foregoing embodiment, the present invention is embodied as a relay adhesion detecting device for electric motor vehicles, whereas the device embodying the invention can be used for other known electrically driven vehicles such as bicycles equipped with an electric motor.

Although one of the secondary batteries 12*a* . . . 12*b* constituting the power source unit 12 is utilized as the power source for the first and second adhesion detecting circuits 16, 18 according to the foregoing embodiment, a desired number of, and not smaller than two, batteries are usable insofar as they are included among the secondary batteries.

Further the foregoing embodiment has incorporated therein the nonvolatile memory 40, such that when the key switch 24 is turned on, the main relay 14 is checked for thermal adhesion with reference to the information concerning the result of detection of adhesion and previously written to the memory 40 upon turning off the switch 24, whereas the nonvolatile memory 40 can be dispensed with. In this case, the first photocoupler 26 of the first adhesion detecting circuit 16 and the photocoupler of the second adhesion detecting circuit 18 are actuated for the detection of adhesion not only when the key switch 24 is turned off but also when the key switch 24 is turned on.

What is claimed is:

1. In an electrically driven vehicle wherein a relay is provided between a load circuit including an electric motor and a plurality of batteries for effecting or interrupting the supply of current from the batteries to the load circuit, a relay adhesion detecting device for detecting occurrence or absence of adhesion in the relay due to melting by detecting presence or absence of current flowing through the relay when the relay is unenergized using one or more of the batteries as a power source.

2. A relay adhesion detecting device according to claim 1 which comprises:

a current passage line for passing current through the relay from one or more of the batteries serving as the power source, line switching means provided on the current passage line for opening or closing the current passage line, and adhesion detecting means provided on the current passage line for detecting occurrence or absence of adhesion in the relay due to melting by detecting presence or absence of current flowing through the current passage line.

3. A relay adhesion detecting device according to claim 2 wherein the line switching means comprises:

a photocoupler provided on the current passage line and operable by being supplied with current, and current supply means for supplying actuating drive current to the photocoupler.

4. A relay adhesion detecting device according to claim 2 wherein the adhesion detecting means comprises:

a photocoupler provided on the current passage line and operable by being supplied with current, and means for checking the relay for adhesion due to melting based on the on/off state of the photocoupler.

5. A relay adhesion detecting device according to claim 2 wherein the current passage line is provided with a resistor for limiting the magnitude of current to be passed through the current passage line to not greater than a predetermined value.

6. A relay adhesion detecting device according to claim 1 which comprises means for informing the user of adhesion occurring in the relay due to melting when the adhesion is detected.

* * * * *